Nov. 23, 1965   F. JARCHOW   3,218,889
TRANSMISSION
Filed Jan. 29, 1963   6 Sheets-Sheet 1

INVENTOR.
Friedrich Jarchow
BY
Michael S. Striker

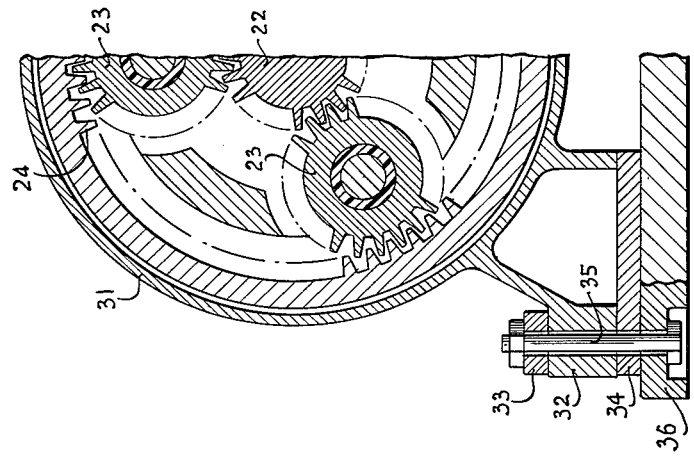
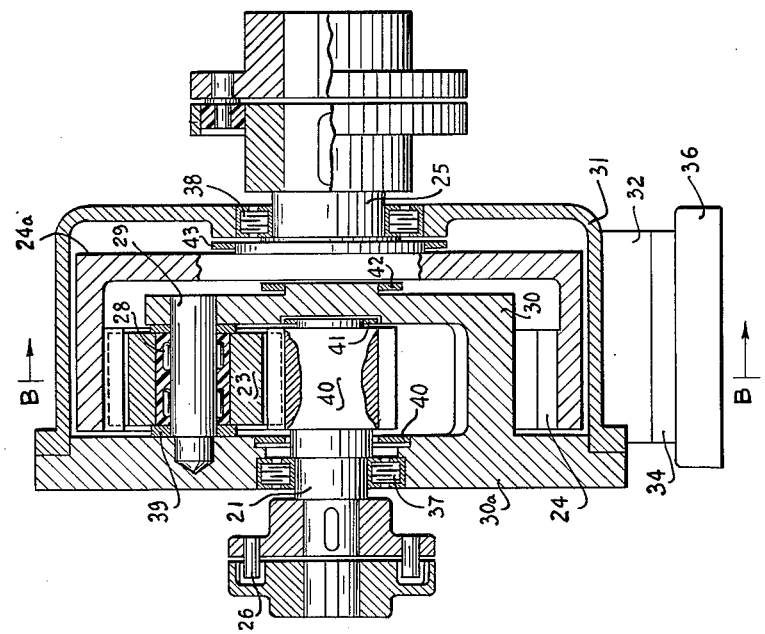

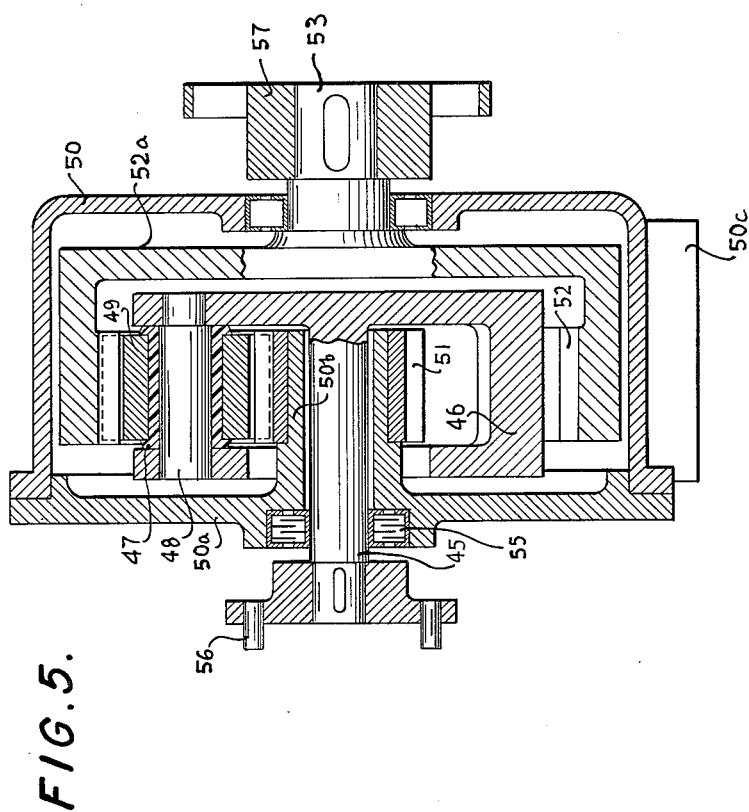

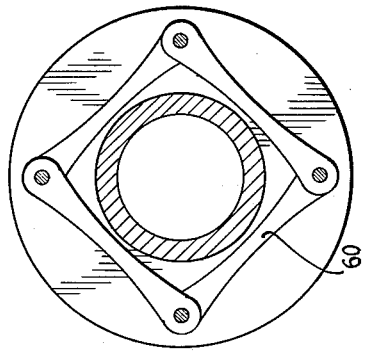
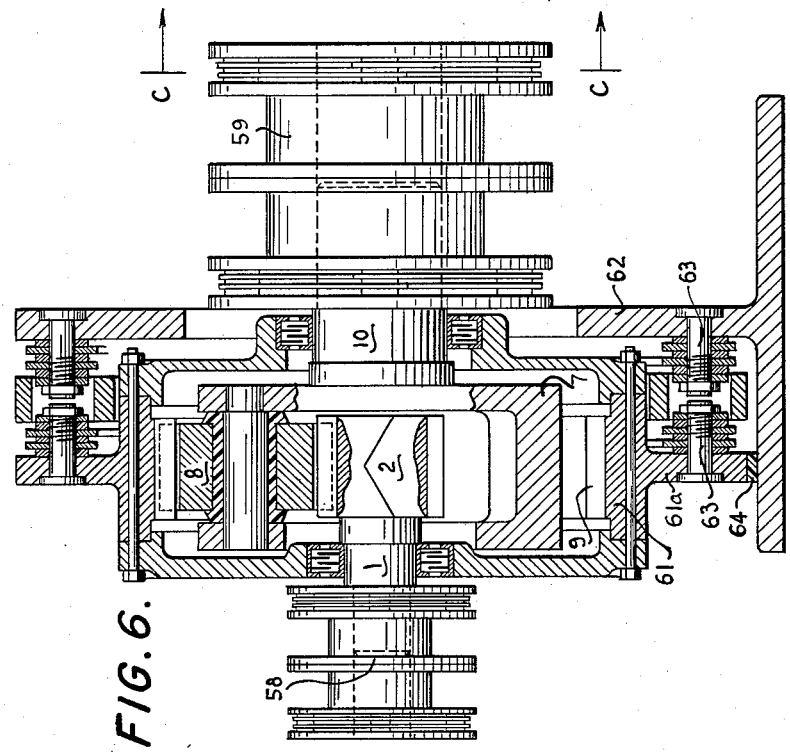

INVENTOR.
Friedrich Jarchow

Nov. 23, 1965   F. JARCHOW   3,218,889
TRANSMISSION
Filed Jan. 29, 1963   6 Sheets-Sheet 6
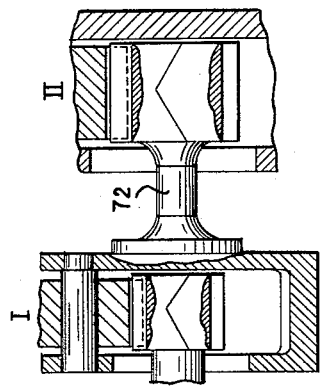
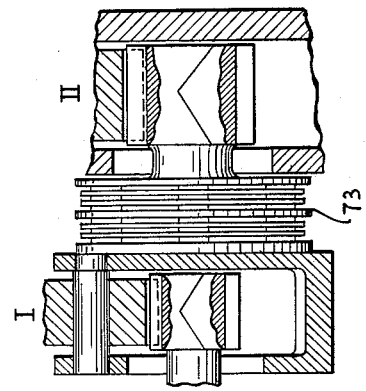
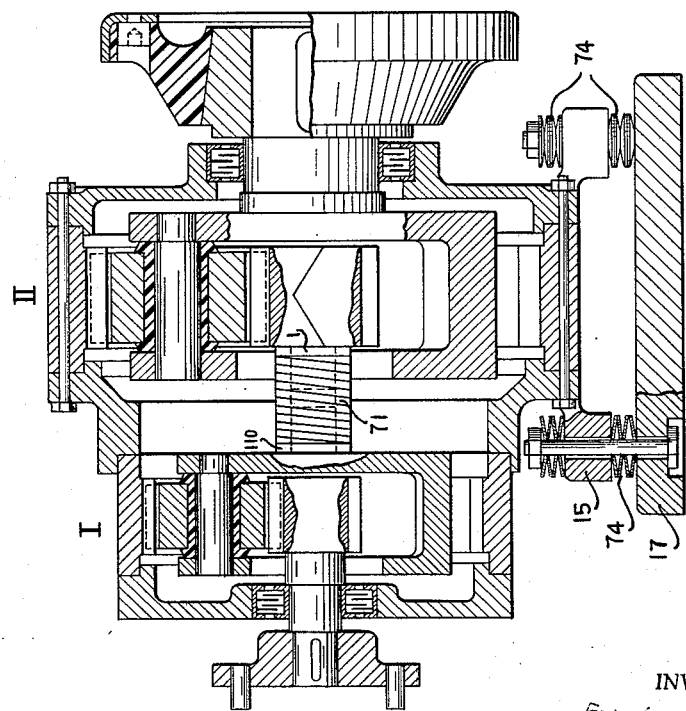
INVENTOR.
Friedrich Jarchow
BY
Michael J. Striker

United States Patent Office 3,218,889
Patented Nov. 23, 1965

3,218,889
TRANSMISSION
Friedrich Jarchow, Essen, Germany, assignor to Rheinstahl Eisenwerke Mulheim/Meiderich A.G., Mulheim (Ruhr), Germany
Filed Jan. 29, 1963, Ser. No. 254,666
Claims priority, application Germany, Feb. 10, 1962,
R 32,074
11 Claims. (Cl. 74—801)

The present invention relates to transmissions in general, and more particularly to a transmission of the type known as a planetary gear system.

It is an important object of my invention to provide a very simple, lightweight, compact, comparatively inexpensive and highly versatile planetary gear system wherein the distribution of stresses to all mating gear teeth is uniform in all phases of operation and wherein such uniform distribution of stresses is brought about in a fully automatic way.

Another object of the invention is to provide a planetary gear system which embodies the just outlined advantages regardless of which of its components receives or transmits motion, which can be coupled to a prime mover without the interposition of an input shaft and which can transmit motion to a working machine without necessitating the provision of an output shaft.

A further object of the invention is to provide a planetary gear system of the above outlined characteristics which is constructed and assembled in such a way that the pressure between the teeth is constant along the entire line of contact between each pair of intermeshing teeth.

An additional object of the instant invention is to provide an improved articulate connection between the base and the housing of a transmission which embodies the above outlined features.

Still another object of the invention is to provide a multi-stage transmission which embodies the aforementioned advantages.

A concomitant object of the invention is to provide a planetary gear system which is practically noiseless, whose efficiency is exceptionally high, which may be readily and rapidly assembled or taken apart for inspection, cleaning or replacement of its parts, which can transmit rotary torque at constant speed, and which comprises a small number of parts.

With the above objects in view, one feature of the present invention resides in the provision of a planetary gear system which comprises a first component including a sun gear, a second component including a cage or carrier and planet pinions rotatably mounted in the cage and mating with the sun gear, a third component including an internal gear mating with the planet pinions, a base, a housing connected with one of the components and loosely mounted on the base so that such one component and the housing may perform at least some axial, radial, tilting and eventually angular movements with respect to the base, and means (such as suitable elastic or laminar couplings) loosely mounting the remaining two components in such a way that each remaining component may perform at least some axial, radial, tilting and eventually angular movements with respect to the one component and that such remaining components may perform similar movement with respect to each other.

For example, the cage of the planet pinions may be rigidly connected to or is integral with the housing, but it is equally possible to make the sun gear or the internal gear rigid with the housing. I often prefer to provide a rigid connection between the housing and the sun gear or the internal gear, whereas the other of these gears and the cage with the planet pinions are loosely mounted in such a way that they may perform axial, radial and eventually tilting and/or angular movements relative to that component which is rigid with the housing.

The novel features which are considered as characteristic of the invention are set forth in particular in the appended claims. The transmission itself, however, both as to its construction and its method of operation, together with additional features and advantages thereof, will be best understood from the following detailed description of certain specific embodiments with reference to the accompanying drawings, in which:

FIG. 3 is a partly elevational and partly axial sectional view of a modified transmission wherein the internal gear and the sun gear is loosely mounted on the base;

FIG. 4 is a fragmentary transverse vertical section as seen in the direction of arrows from the line B—B of FIG. 3;

FIG. 5 is an axial section through a further transmission wherein the internal gear and the cage for the planet pinions is loosely mounted on the base;

FIG. 6 is a partly elevational and partly axial sectional view of a fourth transmission which is similar to the transmission of FIGS. 1 and 2 but wherein the input and output shafts are respectively connected with specially constructed couplings which are stiff against torsion with respect to the prime mover and with respect to the driven machine;

FIG. 7 is a fragmentary transverse vertical section as seen in the direction of arrows from the line C—C of FIG. 6, showing a portion of a laminar coupling which connects the output shaft with the driven machine;

FIG. 9 is a partly elevational and partly axial sectional view of a two-stage transmission wherein the two stages are connected by a flexible motion transmitting coupling which comprises a series of telescoped coil springs;

FIG. 10 illustrates in axial section a portion of a different two-stage transmission wherein the stages are connected by an elastic motion transmitting shaft; and FIG. 11 illustrates in axial section a portion of a third two-stage transmission wherein the stages are connected by a motion transmitting element which assumes the form of a laminar coupling of the type shown in FIG. 7.

Prior to proceeding with a detailed description of the drawings, I wish to state that the expressions "loosely mounted" and/or "universally movable" are intended to denote such mounting of the main components of the various planetary gear systems that each thereof is free to perform at least some axial, radial, tilting and eventually angular movements with respect to the component or components which are in mesh therewith.

Figure 2:
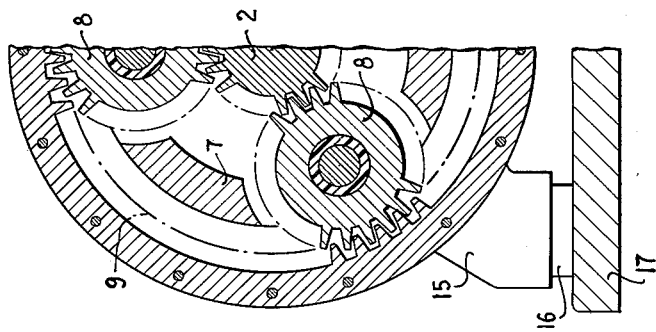
FIG. 2 is a fragmentary transverse vertical section as seen in the direction of arrows from the line A—A of FIG. 1.
Figure 1:
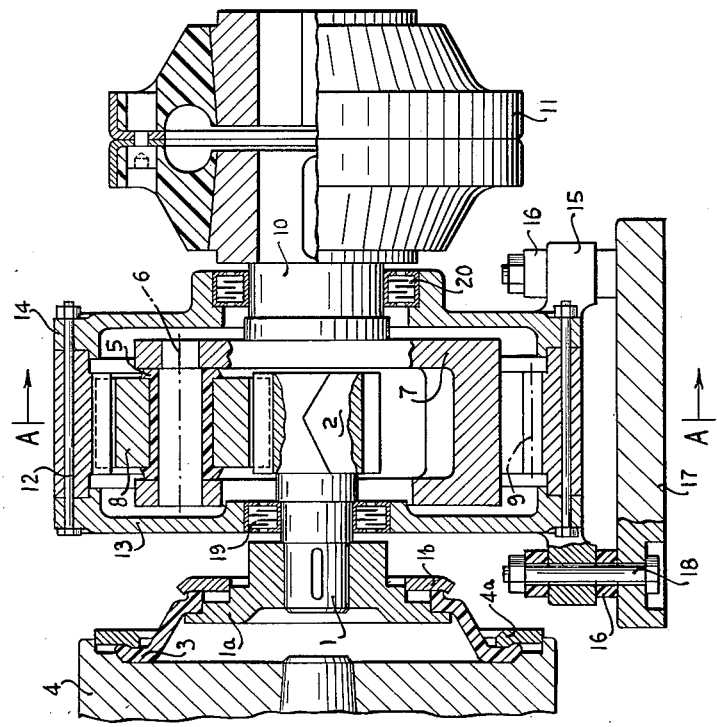
FIG. 1 is a partly elevational and partly axial sectional view of a transmission which embodies one form of my invention and wherein the cage for the planet pinions and the sun gear is loosely mounted on the base.

Referring now in greater detail to the drawings, and first to FIGS. 1 and 2, there is shown a transmission which assumes the form of a single-stage planetary gear system and which includes three main components, namely, a loosely mounted sun gear 2, a loosely mounted carrier or cage 7 for planet pinions 8, and a loosely mounted internal gear 9. In this embodiment of my invention, the sun gear 2 is rigid with an input shaft 1 which is connected to the balance wheel 4 of a prime mover, such as a diesel engine or the like. The connection between the balance wheel 4 and the input shaft 1 comprises an elastic coupling in the form of a sleeve 3 consisting of rubber or similar material whose smaller-diameter end portion is clamped to the annular flange 1a of the shaft 1 by a ring 1b and whose larger-diameter end portion is clamped to the wheel 4 by a second ring 4a. The coupling 3 permits angular, axial, radial and tilting movements of the input shaft 1 (and hence of the sun gear 2) with respect to the balance wheel 4 and with respect to the planet pinions 8 which are loosely mounted on journals 6 carried by the cage 7. Loose mounting of the pinions 8 is due to the provision of elastic bearing sleeves 5 which surround the journals 6 and whose ends comprise larger-diameter flanges enabling the pinions to move axially or radially, to rotate and to be tilted with respect to their journals. In other words, the entire cage 7 is loosely mounted with respect to the sun gear 2 and with respect to the internal gear 9 which latter is rigidly secured to an apertured two-piece holder 13, 14 by spaced bolts 12. The cage 7 is rigid with an output shaft 10 which latter extends freely through the section 14. The shaft 10 is connected with a driven working machine by means of a flexible coupling 11 which permits this shaft to perform angular, axial, radial and tilting movements with respect to the driven machine.

A portion of the internal gear 9 and the apertured sections 13, 14 together constitute a housing for the cage 7 and for the sun gear 2, and the sections 13, 14 are respectively provided with labyrinth seals 19, 20 for the shafts 1, 10. These seals prevent leakage of lubricant from the housing even though their cooperating sealing elements normally do not come into actual contact with each other. Thus, the relatively movable elements of the labyrinth seal 19 are mounted on the input shaft 1 and in the section 13, whereas the other labyrinth seal 20 comprises relatively movable elements mounted on the output shaft 10 and in the section 14.

Each of the sections 13, 14 is provided with one, two or more legs 15 which are mounted on the base or bedplate 17 of the transmission by means of bolts 18 and by interposition of elastic washers 16 so that the housing is actually loosely (universally movably) mounted on the base 17. Owing to the reaction torque of the housing, the washers 16 are normally compressed when the wheel 4 drives the sun gear 2, i.e., the washers 16 which are disposed above the legs 15 are compressed when the input shaft 1 rotates in one direction, and the washers 16 which are located beneath the legs 15 are compressed when the input shaft rotates in the opposite direction.

It is assumed that the gears 2, 9 and the planet pinions 8 are formed with herringbone teeth or with helical teeth which automatically limit axial displacements of the shafts 1 and 10.

FIGS. 3 and 4 illustrate a modified transmission which again assumes the form of a planetary gear system including a loosely mounted sun gear 22 rigid with an input shaft 21 which is driven by a prime mover (not shown) through an elastic coupling 26 of any known design. The teeth of the sun gear 22 mate with the teeth of planet pinions 23 which rotate on needle bearings 28 provided around journals 29 which are carried by a cage 30. The pinions 23 also mate with an internal gear 24 which is rigid with an output shaft 25, and the latter is loosely mounted on a non-illustrated driven working machine by means of an elastic coupling 27. The coupling 27 allows the output shaft 25 to perform angular, tilting, axial and radial movements with respect to the working machine, i.e., the planet pinion cage 30 is universally movable with respect to the working machine, and the coupling 26 enables the sun gear 22 to be universally movable with respect to the prime mover. The gears 22, 24 and the pinions 23 are provided with axially parallel teeth.

A section 30a which is integral with the cage 30 is rigidly connected with an apertured section 31 which resembles a cup so that the sections 30a, 31 together form a housing for the components 22, 23, 24, and the section 31 is provided with legs 32 which are secured to a base 36 by means of bolts 35. Elastic washers or cushions 33, 34 insure that the legs 32 are universally movable with respect to the base 36 within the limits imposed by the elasticity of the washers, by the diameters of the bolts 35 and by the diameters of the bores through which the bolts extend.

Labyrinth seals 37, 38 are respectively mounted between the shafts 21, 25 and the housing sections 30a, 31. As shown in FIG. 3, the internal gear 24 is provided with an inwardly extending collar 24a which is integral with or which is rigidly connected to the output shaft 25.

Excess axial movements of the shafts 21, 25 are prevented by axially shiftable stop rings 39, 40, 41, 42 and 43 whose mounting is clearly shown in FIG. 3. The transmission of FIGS. 3 and 4 is especially suited for operation at high rotational speeds because the bearings 28 of the planet pinions 23 are not subjected to the action of any centrifugal forces. Furthermore, the aforedescribed loose mounting of the shafts 21, 25 is of particular advantage when the transmission operates at high rotational speeds, and such operation is further enhanced by the provision of labyrinth seals 37, 38 whose relatively movable elements normally do not come into actual contact with each other.

FIG. 5 shows a further planetary gear system comprising a loosely mounted input shaft 45 which is rigid with the cage 46 of the planet pinions 49 and which extends through a central bore of a fixed sun gear 51. This sun gear is non-rotatably mounted on the hub 50b of a section 50a which is rigidly connected with a cupped housing section 50, the latter having legs 50c which are connected to the non-illustrated base of the transmission, preferably in the same manner as described in connection with FIGS. 1-2 or 3-4.

The planet pinions 49 are loosely mounted on elastic bearing sleeves 47 which surround journals 48 carried by the cage 46. The internal gear 52 comprises a radially inwardly extending collar 52a which is rigid with the output shaft 53, and the latter is universally movably (i.e., loosely) connected with a non-illustrated working machine by means of an elastic coupling 57. A similar elastic coupling 56 connects the input shaft 45 with the prime mover. Labyrinth seals 54, 55 are respectively provided between the housing sections 50, 50a and the shafts 53, 45 to prevent escape of lubricant from the housing. The gears 51, 52 and the pinions 49 are assumed to be provided with helical teeth or with herringbone teeth.

The transmission of FIG. 6 is analogous to that shown in FIGS. 1 and 2; therefore, certain reference numerals used in FIG. 6 are identical with those which were utilized to describe the transmission of FIGS. 1 and 2. The main difference is that the input shaft 1 is connected with the prime mover by a laminar coupling 58, known for example by the Swiss Patent 320,054, and that a similar laminar coupling 59 connects the output shaft 10 with the driven working machine. The laminations 60 of the coupling 59 may form rectangles (preferably squares) in a manner as shown in FIG. 7, and the laminations of the coupling 58 are preferably arranged in similar fashion. A further set of laminar couplings 63 connects the transmission housing 61 with an annular support 62 which is rigid with the base 63a. The weight of the housing 61 is taken up by an elastic washer 64 which is mounted between the base 63a and a circumferential rib 61a of the housing. The couplings 58, 59 and 63 permit axial, radial and tilting movements of the parts which they support but these couplings hold such parts against angular displacements with respect to each other in contrast to the couplings 3, 11 of FIGS. 1 and 2 which permit truly universal movements of the respective shafts.

Figure 8:
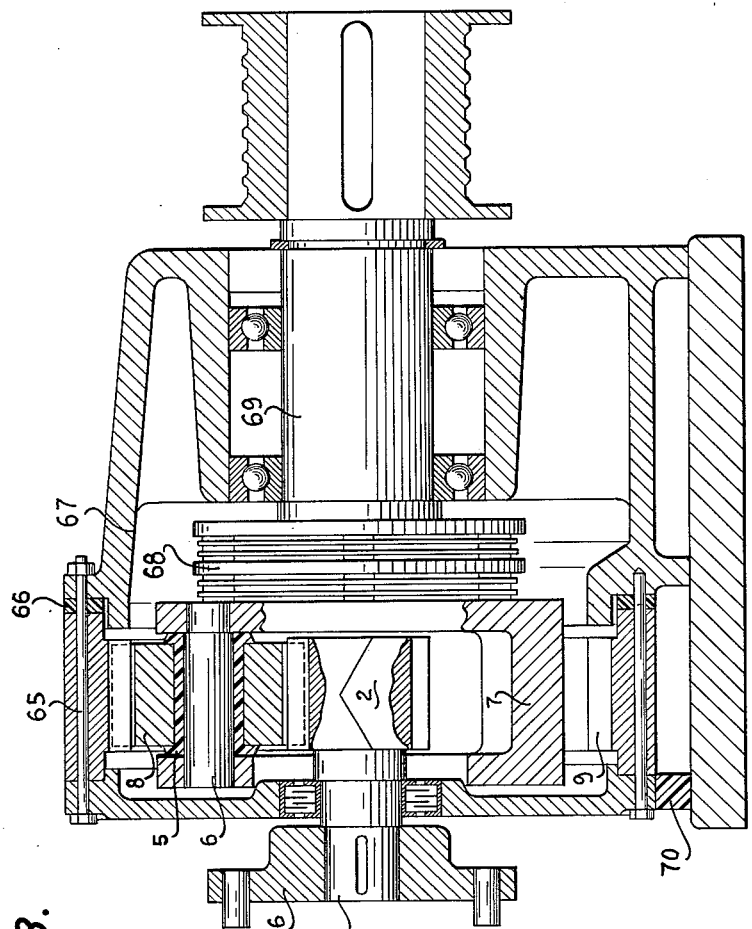
FIG. 8 is an axial section through a further transmission which is similar to the transmission of FIGS. 1–2 and 6 and which is loosely mounted on the casing of a working machine.

In FIG. 8, the transmission comprises a number of parts which are analogous to those shown in FIGS. 1–2 and 6 and which, therefore, are identified by previously utilized reference numerals. The housing of the transmission is secured to the casing 67 of a driven machine by means of bolts 65 and by interposition of an elastic ring 66. This driven working machine is assumed to constitute a cable drum whose shaft 69 (i.e., the driving shaft of the working machine) is directly connected with the cage 7 by means of a laminar coupling 68. Thus, the transmission of FIG. 8 is without a pronounced output shaft such as the shaft 10 of the transmission which is shown in FIGS. 1 and 2. The ring 66 must be dimensioned in such a way that it may stand compressive stresses transmitted by the bolts 65 and serving to transmit reaction torque by friction. The weight of the housing 65 is taken up by an elastic washer 70 which is mounted between this housing and the base of the working machine.

FIG. 9 illustrates a multi-stage transmission which includes a first stage I and a second stage II. In this embodiment of my invention, the loosely mounted output shaft 110 of the first stage I is articulately connected with the input shaft 1 of the second stage II by means of a motion transmitting element here shown as an elastic coupling 71 which assumes the form of a tube including two telescoped coil springs which are under initial stress and whose convolutions are inclined in opposite directions so that this coupling may be used to transmit rotation in a clockwise or in an anticlockwise direction. Furthermore, the legs 15 of the housing forming part of the second stage II are mounted on special cushioning means which assume to form dished springs 74, and which replace the elastic washers 16 of FIG. 1.

In FIG. 10, the output shaft of the first stage I is connected with the input shaft of the second stage II by a different motion transmitting element which assumes the form of an elastic shaft 72. This elastic shaft is also capable of transmitting rotation in a clockwise or anticlockwise direction.

In FIG. 11, the input shaft of the second stage II is connected with the output shaft of the first stage I by a motion transmitting element in the form of a laminar coupling 73 which is analogous to the coupling of FIG. 7.

Since the first stage of each of the transmissions shown in FIGS. 9 to 11 drives the input shaft of the respective second stage, it can be said that each first stage constitutes the prime mover for the respective second stage and that each second stage constitutes a working machine which is driven by the respective first stage.

It is to be understood that the aforementioned loose mounting of the main components in the transmissions shown in FIGS. 1 to 11 is not intended to permit unlimited movements of such components but solely such movements which are necessary to insure that the distribution of stresses to all teeth which momentarily transmit motion is as uniform as possible. In other words, the pressure between the teeth should be uniform between each pair of mating teeth. As known, the transmission of power and the distribution of stresses upon the mating teeth are optimal if the pressure at each point of contact (i.e., along the full line of contact) between two intermeshing teeth is constant. Such uniform distribution of stresses is normally prevented by a series of factors, such as insufficient or inaccurate finish of tooth flanks, errors in pitch, different configuration of gear teeth on a pinion, errors in the shape of the gear tooth involute, and many others. Furthermore, such unequal distribution of stresses may be due to elastic deformation of gear teeth and to twisting of gear teeth at the time a pair of mating gears transmits motion, to eccentricity of bores in the bearings, to deformation of the transmission housing and/or of the base when the transmission is in actual use, to bending of gear shafts and journals, to bending of pinion shafts, etc. Insofar as I am advised at this time, all attempts to solve the problem of equally distributing stresses to all points of contact between the mating teeth of gears and pinions in planetary gear systems have met with little or no success because the solutions were too complicated and too expensive, because the transmission became too heavy or too bulky, because the transmission was too prone to malfunction, because the transmission operated satisfactorily only under certain loads, or for other reasons.

Common to all embodiments of my invention is the feature that all three main components of the transmission (namely, the sun gear, the internal gear and the cage with the planet pinions) are loosely mounted with respect to each other and that one of such components is rigidly connected with and may form part of the transmission housing which latter, in turn, is connected with the base, preferably by interposition of elastic washers or similar cushions so that one can say that the housing is loosely mounted on the base.

In the planetary gear system of my invention, all freely movable (loosely mounted) components are automatically compelled by the mating teeth to assume such positions which permit uniform distribution of stresses along the entire line of contact between each pair of intermeshing teeth. Such mounting of the components also compensates for any inaccuracies in the machining of parts, for elastic deformation of the components when the planetary gear system transmits torque, and such mounting also contributes to a reduction of dynamic stresses which arise when the transmission is in use. Rotation of the components takes place about free axes which are not restricted by rigid bearings and which automatically adjust their positions by following the path of least resistance.

As a rule, I prefer to assemble the planetary gear system in such a way that there is rather little play between the flanks of intermeshing teeth. Furthermore, the arrangement is preferably such that, in all situations (i.e., regardless of whether the transmission is idle or whether it transmits torque to a working machine), there is at least some radial play between the planet pinions and the gears which mesh therewith. Consequently, even if the input shaft is disconnected from the prime mover and if the output shaft is disconnected from the driven machine, the pinions and the gears still remain in such positions that their tooth faces do not contact the adjacent teeth.

It will be readily understood that the aforementioned labyrinth seals may be replaced by other types of seals which are sufficiently elastic to permit universal movements of the input and output shaft. Such elastic seals may be in actual contact with the shafts if they are mounted in the housing, or vice versa.

The function of the coupling between the input shaft and the prime mover and/or the output shaft and the driven machine should be equivalent to the combined function of at least two simple articulated joints. If the couplings are elastic (such as the couplings 3 and 11 of the transmission shown in FIGS. 1 and 2), the transmission is practically noiseless because the couplings absorb at least some noise which is produced by the mating teeth. Of course, the elastic characteristics of such couplings should be selected in such a way that the couplings prevent excessive vibrations of the components. Furthermore, the elastic characteristics of the couplings will depend on the mass and on the r.p.m. of the revolving parts.

When the pinions and the gears of the improved planetary gear system are provided with herringbone teeth either the planet pinions or one of the gears must consist of several sections which are connected by screw bolts after the pinions are assembled with the gears. If the teeth of the gears and of the planet pinions are axially parallel, the aforementioned stop rings 39–43 are used to prevent excessive axial movements of intermeshing gears and pinions and to limit axial movements of the shafts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A motion transmitting arrangement comprising a rotary prime mover; a driven device; and a planetary gear system for transmitting rotation from said prime mover to said device, said system comprising a base, a first component including a sun gear, a second component including a cage and planet pinions rotatably mounted in said cage and mating with said sun gear, a third component including an internal gear mating with said pinions, each of said components being free to move at least in all radial directions with reference to each of the other of said components; housing means rigidly connected with one of said components, means for articulately connecting said housing means to said base so that the housing means and said one component are free to perform at least radial and axial movements with reference to said base, first elastic coupling means connecting said prime mover with another of said components, and second elastic coupling means connecting said driven device with the remaining component, both said coupling means being arranged to permit at least radial and axial movements of the respective components and the extent of all said movements being such that the pressure between the teeth of said pinions and the teeth of said gears is substantially constant along the entire line of contact between such teeth when said prime mover rotates to drive said device.

2. An arrangement as set forth in claim 1, wherein at last one of said coupling means permits angular, axial, radial and tilting movements of the respective components.

3. A motion transmitting arrangement as set forth in claim 1, wherein said remaining component is said second component.

4. A motion transmitting arrangement as set forth in claim 1, further comprising an input shaft extending into said housing means and connecting said first coupling means with said other component, an output shaft extending into said housing means and connecting said second coupling means with said remaining component, and labyrinth seals provided between said shafts and said housing means, each of said seals comprising a first element mounted in said housing and a second element mounted on the respective shaft, said elements being normally out of contact with each other.

5. A motion transmitting arrangement as set forth in claim 1, wherein at least one of said coupling means is a laminar coupling.

6. A motion transmitting arrangement as set forth in claim 1, wherein said pinions and said gears are provided with herringbone teeth.

7. A motion transmitting arrangement as set forth in claim 1, wherein said pinions and said gears are provided with axially parallel teeth and further comprising an input shaft extending into said housing means and connecting said other component with said first coupling means, an output shaft extending into said housing means and connecting said remaining component with said second coupling means, said shafts and the respective components being movable axially with reference to said housing means and said housing means being provided with stop means for limiting axial movements of said shafts.

8. A motion transmitting arrangement as set forth in claim 1, wherein said pinions and said gears mesh with small play between the flanks of their teeth and wherein at least some radial play remains between the mating gears at all operating conditions of said transmission.

9. A motion transmitting arrangement as set forth in claim 1, wherein said housing means comprises an overhung portion, and wherein the means for articulately connecting said housing means to said base comprises elastic cushioning means interposed between said overhung portion and said base.

10. A motion transmitting arrangement as set forth in claim 1, wherein said prime mover comprises a planetary gear transmission including an output shaft connected with said first coupling means and said other component comprises an input shaft connected with said first coupling means.

11. A motion transmitting arrangement comprising a rotary prime mover; a driven device; and a planetary gear system for transmitting rotation from said prime mover to said driven device, said system comprising a first component including a sun gear, a second component including a cage and planet pinions rotatably mounted in said cage and mating with said sun gear, a third component including an internal gear mating with said pinions, each of said components being free to move at least in all radial directions with reference to each of the other of said components, housing means connected with one of said components, first elastic coupling means connecting said prime mover with another of said components, and second elastic coupling means connecting said driven device with the remaining component, said coupling means being arranged to permit at least radial, axial and tilting movements of the respective components and the extent of all said movements being such that the pressure between the teeth of said pinions and the teeth of said gears is substantially constant along the entire line of contact between such teeth when said prime mover rotates to drive said device.

References Cited by the Examiner

UNITED STATES PATENTS

| | | | |
|---|---|---|---|
| 1,591,826 | 7/1926 | Hodgkinson | 74—410 |
| 2,209,120 | 7/1940 | Hoffman | 74—801 |
| 2,245,281 | 6/1941 | Klopak | 277—56 |
| 2,460,629 | 2/1949 | Fawick | 74—801 |
| 2,505,002 | 4/1950 | Orr | 74—801 |
| 2,662,434 | 12/1953 | Burkhardt | 74—801 X |
| 2,698,013 | 12/1954 | Brill et al. | 74—410 X |
| 2,703,021 | 3/1955 | Stoeckicht | 74—801 X |
| 2,801,552 | 8/1957 | Stubbings et al. | 74—801 |
| 2,802,377 | 8/1957 | Berthiez | 74—410 X |
| 2,844,052 | 7/1958 | Stoeckicht | 74—411 X |
| 2,980,373 | 4/1961 | Pyles | 74—801 X |
| 3,081,648 | 3/1963 | Duer | 74—801 |
| 3,090,258 | 5/1963 | Zink et al. | 74—801 |
| 3,128,104 | 4/1964 | Teske | 277—56 X |

FOREIGN PATENTS

| | | |
|---|---|---|
| 963,414 | 1/1950 | France. |
| 606,634 | 12/1934 | Germany. |
| 609,654 | 2/1935 | Germany. |
| 740,944 | 11/1943 | Germany. |

DON A. WAITE, *Primary Examiner.*